US006513405B1

(12) United States Patent
Stürmer et al.

(10) Patent No.: US 6,513,405 B1
(45) Date of Patent: Feb. 4, 2003

(54) TWIST GRIP SHIFT LEVER FOR BICYCLES

(75) Inventors: Joachim Stürmer, Schweinfurt (DE); Peter Feiler, Bergrheinfeld (DE); Markus Arbeiter, Köln (DE); Peter Kröger, Schweinfurt (DE); Jean Bernard Plée, Cambron (FR)

(73) Assignee: SRAM Deutschland GmbH (DE)

( * ) Notice: Subject to any disclaimer, the term of this patent is extended or adjusted under 35 U.S.C. 154(b) by 0 days.

(21) Appl. No.: 09/700,789

(22) PCT Filed: Mar. 28, 2000

(86) PCT No.: PCT/EP00/02707

§ 371 (c)(1),
(2), (4) Date: Apr. 13, 2001

(87) PCT Pub. No.: WO00/59775

PCT Pub. Date: Oct. 12, 2000

(30) Foreign Application Priority Data

Apr. 3, 1999 (DE) ........................................ 199 15 333

(51) Int. Cl.[7] .................................................. F16C 1/12
(52) U.S. Cl. ...................................... 74/501.6; 403/326
(58) Field of Search ............................ 74/501.6, 502.2, 74/504, 506; 403/326, 329, 315–317

(56) References Cited

U.S. PATENT DOCUMENTS 5,421,219 A * 6/1995 Tagawa et al. ............ 74/502.2
5,588,331 A 12/1996 Huang et al. ................. 74/489
5,893,573 A * 4/1999 Arbeiter ..................... 280/238
6,021,688 A * 2/2000 Chang ....................... 74/502.2
6,067,875 A * 5/2000 Ritchey et al. ............ 74/502.2
6,209,413 B1 * 4/2001 Chang ....................... 74/502.2
6,276,227 B1 * 8/2001 Ose ............................ 74/489

FOREIGN PATENT DOCUMENTS

DE 19723346 12/1998

* cited by examiner

*Primary Examiner*—Chong H. Kim
(74) *Attorney, Agent, or Firm*—Milan Milosevic; Lisa Wunderlich

(57) ABSTRACT

A twist-grip shift mechanism that includes a housing part, a rotating part and a ring disposed in the rotating part. The housing part includes a cylindrical extension and a housing extension. The rotating part is rotatably mounted on the cylindrical extension. The cylindrical extension has tongues with retaining profiles extending from one end of the cylindrical extension for releaseably connecting to the ring. The tongues and the retaining profiles do not extend beyond an outer diameter of the cylindrical extension so that the housing part may be formed by an injection molding process using a single half of an injection mold, thereby eliminating undercuts and other molding inaccuracies.

14 Claims, 3 Drawing Sheets

16
15
12
11
14
3
4
9
8
10
1
2
6
5

1
8
9
10
2
6
5
4
3
14
12
15
16
11

1a
5a
2a
7a
9a
10a
10a
4a
3a
12a
11a
15a
16a 13
2
5
6
14
3
16
1
15
7
8
11
12
17
4

15a
12a
11a
10a
7a
8a
16a
14a
17a
13a
3a 2a
5a
6a
1a

TWIST GRIP SHIFT LEVER FOR BICYCLES

BACKGROUND OF THE INVENTION

The invention relates to a twist-grip shift mechanism for bicycles and in particular a twist-grip shift mechanism having a housing part formed by an injection molding process using a single half of an injection mold to eliminate undercuts.

German Patent Application DE 197 23 346.5 discloses a shift mechanism for controlling transmissions on bicycles, in particular a twist-grip shift mechanism to be fitted on the handlebars. This shift mechanism includes a fixed housing connected to the handlebars and a housing that is fixed axially with the fixed housing and can be rotated by hand. The fixed housing and the rotatable housing form a unit. The rotatable housing has an inner cylinder with outward-facing recesses and the fixed housing has an outer cylinder with bayonet hooks on its axially outer end face. The inner cylinder of the rotatable housing may be pushed onto the outer cylinder of the fixed housing to form a bearing. The two housings may be connected permanently to one another by rotating the rotatable housing relative to the fixed housing until a latching point is reached.

A problem associated with the above configuration is the proper molding of the two housing to form a satisfactory bearing. During the molding process, undercuts may form. The undercuts cause parting seams and molding inaccuracies which may cause connecting problems when the two housings are bought together to form the bearing. Therefore, there is a need for a shift mechanism that eliminates the above stated problem.

SUMMARY OF THE INVENTION

The present invention provides a twist-grip shift mechanism for bicycles with a fixed housing which has a cylindrical extension surrounding a handlebar to support a rotating part. To eliminate the above stated problems the cylindrical extension is configured in such a way that no contours that connect with the rotating part go beyond the outside diameter of the cylindrical extension. Another factor that contributes to an efficient manufacturing process is that there is a housing extension surrounding a cable bobbin on the rotating part. The housing extension is formed as part of the housing part. The contours are formed on the outside diameter of the cylindrical extension during an injection molding method using a single mold half of an injection mold. The advantage of this manufacturing method is a homogeneous cylindrical surface of the cylindrical extension, which serves as a bearing for the rotating part resulting in no parting seams or molding inaccuracies that could impair operation of the twist-grip shift mechanism during actuation.

The above-mentioned manufacturing method may also be used for molding tongues with retaining profiles onto the cylindrical extension for releasable assembly with latching profiles of a ring. The retaining profiles include apertures to prevent them from projecting beyond the limits determined by the inner and outer diameters of the cylindrical extension. The latching profiles on the ring are designed as hooks engageable with the apertures in the tongues.

The rotating part and the cable bobbin may be encapsulated with a grip part made of rubber-elastic material. Such a configuration allows a radially inward-pointing lip to be molded on the grip that extends beyond the overall length of the rotating part on the side opposite the cable bobbin. In the installed condition, the lip engages in a radially outward-facing groove arranged in the ring. This allows the bearing between the rotating part and the cylindrical extension to be kept free from penetrating dirt, thus ensuring the functioning of the lubricated bearing over a prolonged period.

It is therefore the object of the invention to provide an injected molded housing part for a twist-grip shift mechanism having a cylindrical extension that includes an outer functional surface and a housing extension that includes inner contours that is configured to allow the use of a single half of an injection mold, thereby eliminating undercuts and other molding inaccuracies.

DETAILED DESCRIPTION

Figure 1:
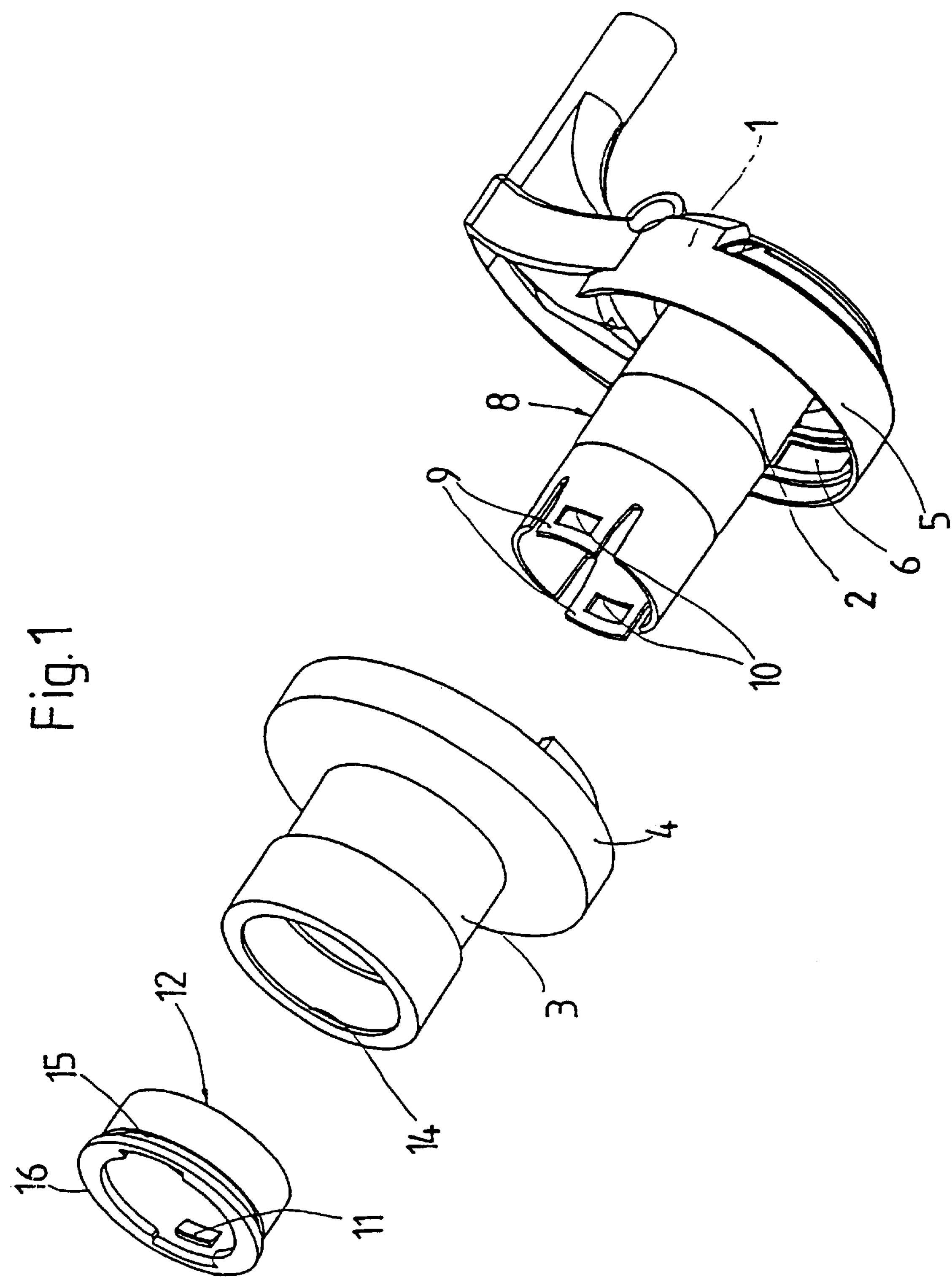
FIG. 1 is an exploded view of a twist-grip shift mechanism in accordance with a specific embodiment of the present invention.
Figure 2:
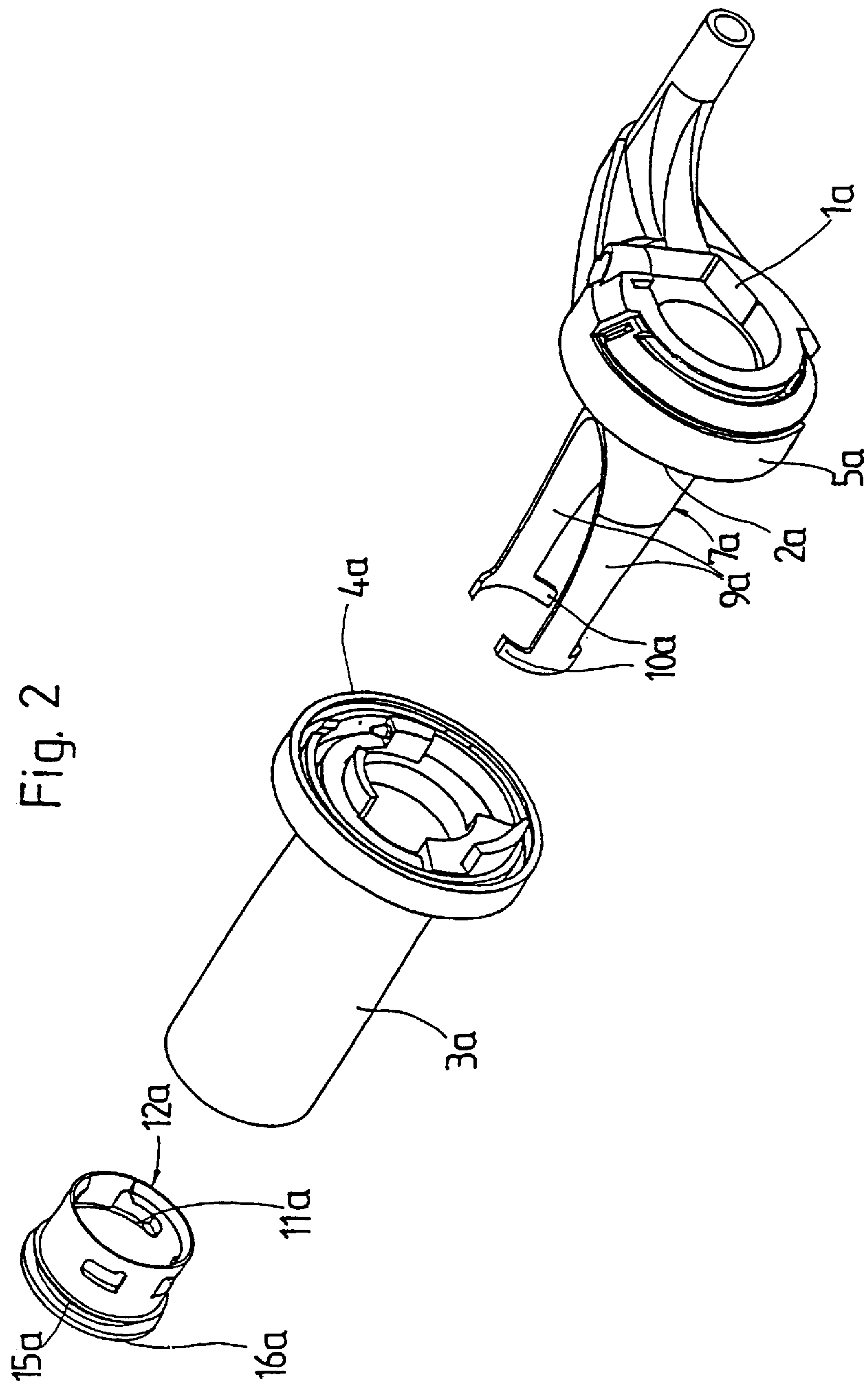
FIG. 2 is an exploded view of a twist-grip shift mechanism in accordance with a specific embodiment of the present invention.

FIGS. 1 and 2 illustrate two embodiments of a twist-grip shift mechanism of the present invention. The twist-grip shift mechanism includes a housing part 1,1*a* fixed on a handlebar tube of handlebars of a bicycle. The housing part 1,1*a* may be configured in such a way that a tension cable (not shown) may be pulled and released to control a bicycle transmission. The tension cable is connected to a rotating part 3,3*a* by a cable bobbin 4,4*a* arranged on the latter and is set in motion by rotating the bobbin. The rotating part 3,3*a* is mounted rotatably on a cylindrical extension 2,2*a* connected to the housing part 1,1*a*. In an axial direction away from the housing part 11*a*, the cylindrical extension 2,2*a* has tongues 9,9*a* with retaining profiles 10,10*a* that can be joined together with latching profiles 11,11*a* of a ring 12,12*a*. The rotating part 3,3*a* is mounted to the housing part 1,1*a* by pushing it over the tongues 9,9*a* and onto the cylindrical extension 2,2*a* of the housing part 1,1*a*. Resulting in the rotating part 3,3*a* being fixed axially relative to the housing part 1,1*a* and supported rotatably on the cylindrical extension 2,2*a*.

Figure 3:
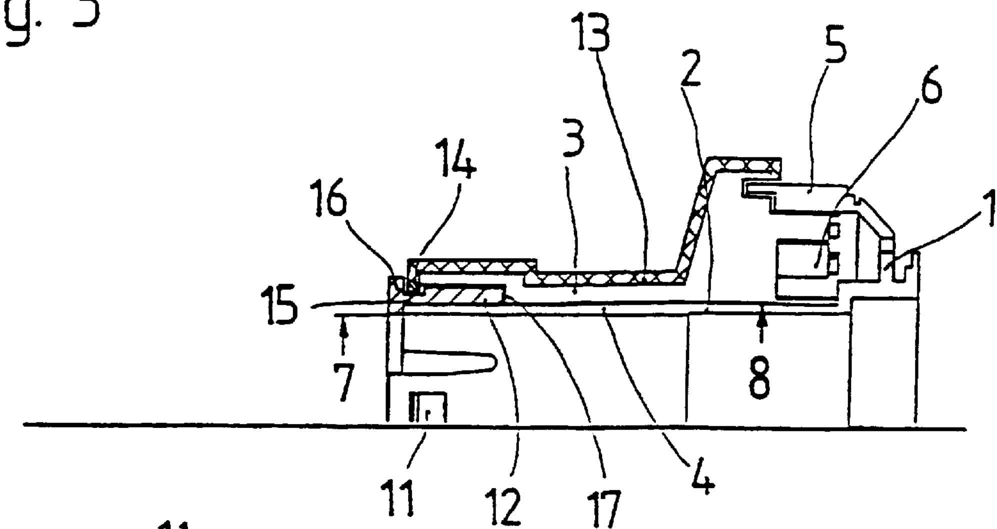
FIG. 3 is a cross-sectional view of the twist-grip shift mechanism shown in FIG. 1.

Referring to FIGS. 1 and 3, the ring 12 may be pushed over the tongues 9 within the rotating part 3 until the latching profiles 11 of the ring 12 fit together with the retaining profiles 10 of the tongues 9. Resulting in the tongues 9 being forced to bend radially inward during assembly. Once the latching profiles 11 are fitted together with the retaining profiles 10 of the tongues 9, the rotating part 3 is fixed axially relative to the ring 12 by an end face 17 and, in the other direction, is fixed axially relative to the housing part 1.

In reference to FIGS. 1 to 4, the smallest inside diameter 7,7*a* of the cylindrical extension 2,2*a* with its tongue 9,9*a* corresponds to the diameter of the handlebar tube. The bearing for the rotating part 3,3*a* has an outside diameter 8,8*a* which must not be exceeded by the integrally formed tongues 9,9*a* with their retaining profiles 10,10*a* in order to ensure that these parts can be produced with a single half of an injection mold by a material injection method. However, efficient production of the housing part 1,1*a* is only possible if inner contours 6,6*a* of a housing extension 5,5*a* that is formed integrally on the housing part 1,1*a* and forms an annular space that essentially surrounds the cable bobbin 4,4*a* can likewise be formed by this half of the injection mold. The contours 6,6*a* are arranged in the housing extension 5,5*a* to guarantee the functioning of the two parts 1,1*a* and 3,3*a*. To ensure that the bearing on a functional surface of the cylindrical extension 2,2*a* and the inner contours 6,6*a* in the housing extension 5,5*a* can be produced economically and with optimum molding accuracy, it is necessary that the retaining profiles 10,10*a* on the tongues 9,9*a* do not project beyond the diameters 7,7*a* and 8,8*a*.

Figure 4:
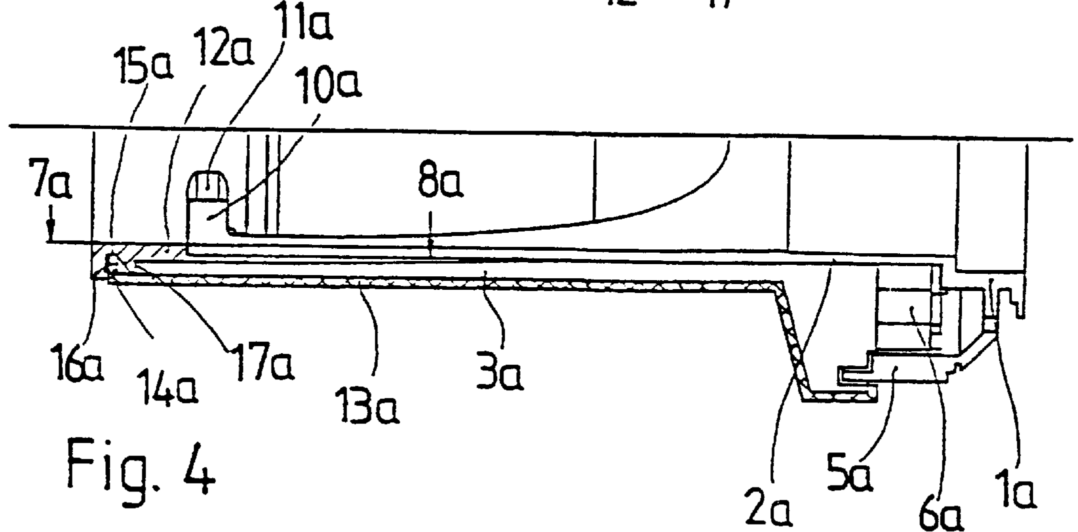
FIG. 4 is a cross-sectional view of the twist-grip shift mechanism shown in FIG. 2.

The rotating part 3,3*a* has a grip part 13,13*a* connected to a radially outward-facing surface of the rotating part, which is made from a rubber-elastic material to allow better operation by the hand of the bicycle rider. The grip part 13,13*a* has a lip 14,14*a* that projects beyond the axial length of the rotating parts 3,3*a*. The lip 14,14*a* points radially inward and extends into a groove 15,15*a* in the ring 12,12*a*, thereby providing a labyrinth-type seal against contamination of the bearing from outside. The groove 15,15*a* is formed by an outer collar 16,16*a* at the end of the ring 12,12*a*. The collar 16,16*a* protects the end face of the grip part 13,13*a*, which is sensitive to shock loading. In reference to FIGS. 3 and 4 the lip 14,14*a* is deformed elastically during the fitting of the ring 12,12*a* in order to enter the groove 15,15*a*. FIGS. 3 and 4 likewise show the twist-grip shift mechanism as an assembly in the form in which it can be pushed onto the handlebar tube of the handlebars of the bicycle and fixed there by a screwed or clip-type connection (not shown).

Referring to FIGS. 2 and 4, which show another embodiment of the twist-grip shift mechanism, the twist-grip shift mechanism includes the housing part 1*a* having the cylindrical extension 2*a* and the tongues 9*a* plus the twisting part 3*a* and with the ring 12*a*. While the retaining profiles 10 of the twist-grip shift mechanism shown in FIGS. 1 and 3 are designed as apertures, the tongues 9*a* shown in FIGS. 2 and 4 have T-shaped retaining profiles 10*a* that can interact with correspondingly shaped latching profiles lla in the ring 12*a*. The difference between the assembly of the ring 12 with the tongues 9 and the assembly of the ring 12*a* with the tongues 9*a* is that, after being latched in, the retaining profiles 10*a* of the tongues 9*a* can be disengaged from the latching profiles 11*a* by turning the ring 12*a*. During this process, the tongues 9*a* are deflected radially inward, and the ring 12*a* can be pulled off axially, although this is only possible while the shift mechanism is not mounted on the handlebar tube of the handlebars of the bicycle. It should be pointed out once again that the functional surface of the cylindrical extension 2*a* with the outside diameter 8*a* can be molded with a single mold half and the T-shaped retaining profiles 10*a* do not exceed the outside diameter 8*a*.

What is claimed is:

1. A twist-grip shift mechanism for bicycles for mounting in a grip region of a handlebar, the twist-grip shift mechanism comprising:

a housing part fixed to the handlebar, the housing part having a cylindrical extension surrounding the handlebar and a housing extension having an inner contour;

a rotating part having a cable bobbin and rotatably mounted on the cylindrical extension, the housing extension at least partially surrounding the cable bobbin; and a ring disposed in the rotating part and connected to the cylindrical extension, the cylindrical extension having tongues extending from one end, the tongues having retaining profiles for engaging the ring, the tongues and retaining profiles not extending beyond an outside diameter of the cylindrical extension to allow the housing part to be formed by an injection molding process using a single half of an injection mold.

2. The twist-grip shift mechanism as claimed in claim 1, wherein the tongues have a limited spring travel in a radial direction.

3. The twist-grip shift mechanism as claimed in claim 1, wherein the retaining profiles are joined releaseably to latching profiles on the ring.

4. The twist-grip shift mechanism as claimed in claim 1, wherein the retaining profiles are apertures in the tongues.

5. The twist-grip shift mechanism as claimed in claim 1, wherein the tongues have a configuration such that the tongues are connected to and/or released from the ring when the twist-grip shift mechanism is not connected to the handlebar.

6. The twist-grip shift mechanism as claimed in claim 3, wherein the latching profile is released from the retaining profile by turning the ring relative to the cylindrical extension.

7. The twist-grip shift mechanism as claimed in claim 1, wherein the rotating part is secured in an axial position by the housing part at one end and an end face of the ring at the other end.

8. The twist-grip shift mechanism as claimed in claim 1, wherein the rotating part is surrounded by a grip part made from a rubber-elastic material and rotationally fixed to the rotating part.

9. The twist-grip shift mechanism as claimed in claim 8, wherein the grip part is produced by encapsulating the rotating part, thereby connecting it permanently to the rotating part.

10. The twist-grip shift mechanism as claimed in claim 1, wherein on a side opposite the cable bobbin, the grip part has a lip extending beyond an overall length of the rotating part, pointing radially inward and projecting into an outward-facing groove in the ring to form a labyrinth seal.

11. The twist-grip shift mechanism as claimed in claim 10, wherein the groove of the ring is formed in a collar substantially covering an end of the grip part.

12. The twist-grip shift mechanism as claimed in claim 1, wherein the outside diameter of the cylindrical extension is designed as a homogeneous bearing for the rotating part without parting seams and molding inaccuracies.

13. The twist-grip shift mechanism as claimed in claim 1, wherein the retaining profiles are T-shaped engageable with correspondingly shaped latching profiles on the ring.

14. The twist-grip shift mechanism as claimed in claim 3, wherein the latching profiles on the ring are hooks.

* * * * *